UNITED STATES PATENT OFFICE.

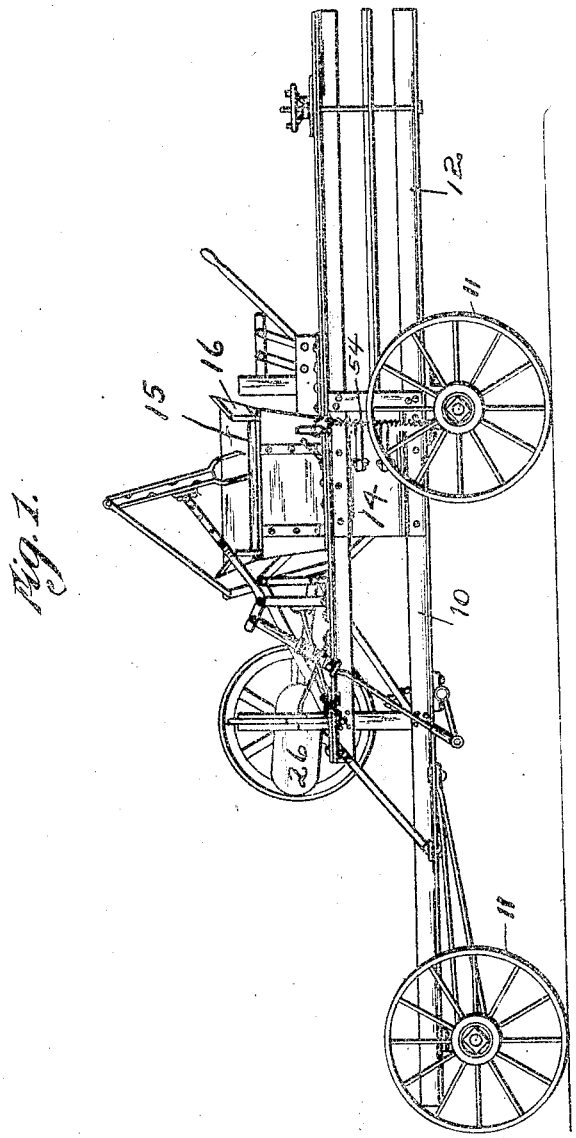

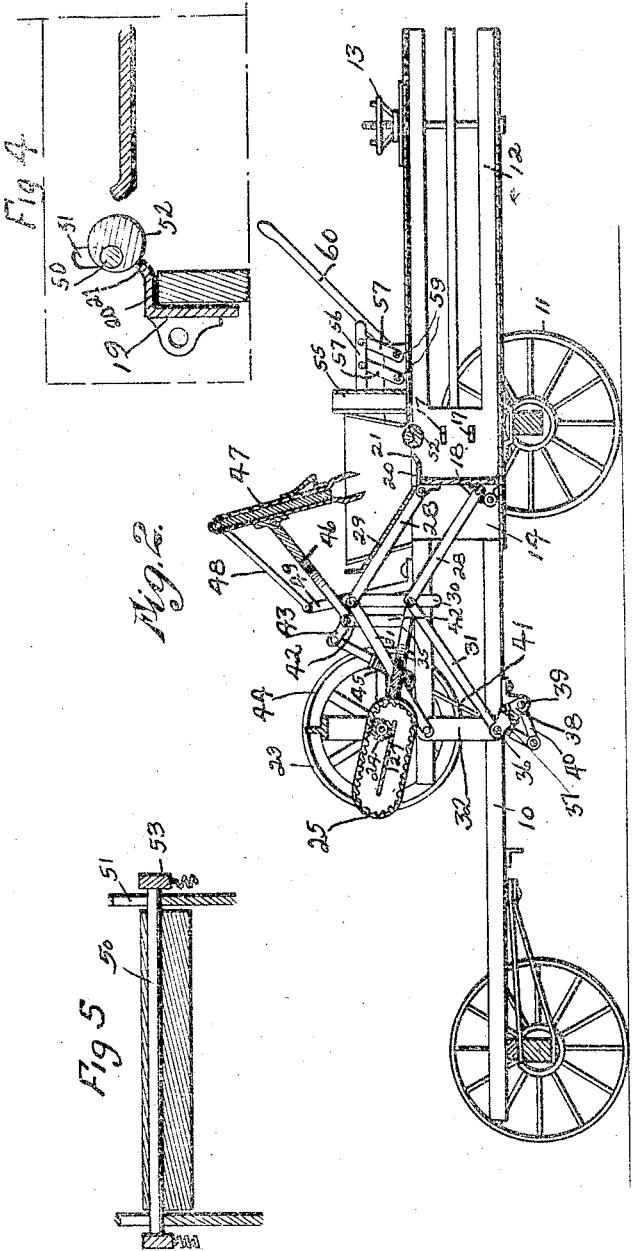

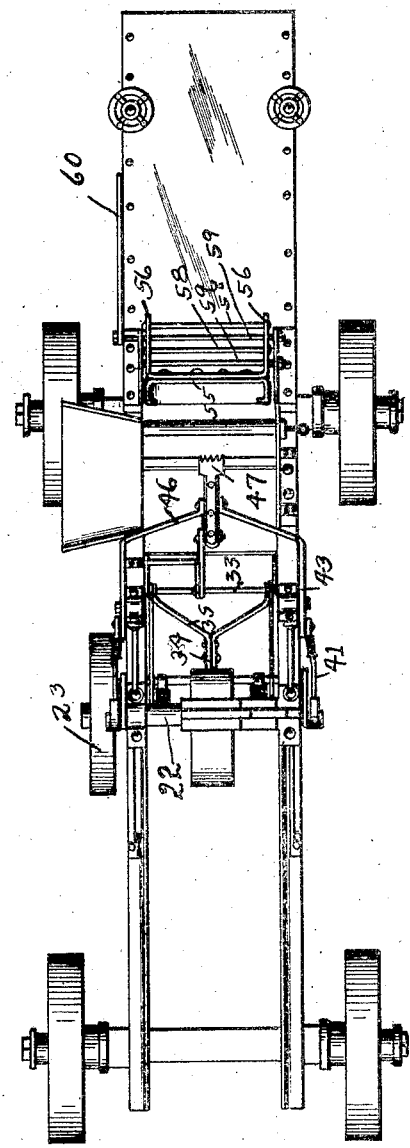

MARY A. GIBBONS, OF DES MOINES, IOWA.

HAY-BALER.

1,132,083.

Specification of Letters Patent. Patented Mar. 16, 1915.

Application filed January 13, 1914. Serial No. 811,876.

*To all whom it may concern:*

Be it known that I, MARY A. GIBBONS, a citizen of the United States, and resident of Des Moines, in the county of Polk and State of Iowa, have invented a certain new and useful Hay-Baler, of which the following is a specification.

The object of my invention is to provide a hay baler of simple, durable and inexpensive construction.

More particularly, it is my object to provide a hay baler with new and novel means for feeding the spacing blocks between the successive bales.

Still a further object is to provide a new device for operating the feeding arm.

Still a further object is to provide a new and improved tucker of simple and inexpensive construction.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a side elevation of a hay baler, embodying my invention. Fig. 2 shows a vertical, sectional view through the same. Fig. 3 shows a top or plan view of my baler. Fig. 4 shows a detail sectional view, taken on a vertical line through the tucker and adjacent parts. Fig. 5 shows a longitudinal, vertical, sectional view through the tucker.

In the accompanying drawings I have used the reference numeral 10 to indicate generally a frame supported on the wheels 11 of my improved baler. Extending rearwardly from the wheels 11 at one end of the baler, is an ordinary bale receiving chute or guide device comprised of angle irons 12. Near the outer or free end of the guide members 12 is an ordinary device 13 for drawing the upper and lower parts together for imposing tension on the bales and holding them tightly between the guide members 12. Suitably mounted at the forward end of the guide members 12 is a receptacle 14 for receiving the hay. Adjacent to the upper end of the receptacle, at one side thereof, is a feeding table 15, having side wings 16. The front and rear ends of the receptacle 14 are open, the front end to permit the entrance of the plunger hereinafter described and the rear end to permit exit of the hay. In the side walls of the receptacle 14 are the ordinary pawls 17 for preventing the rebound of the hay. Slidably mounted on the frame of the machine and arranged to slide from a position in front of the receptacle 14 to the rear end thereof is a plunger 18. Secured to the forward wall of the plunger 18, at its upper edge, is one flange 19 of an angle iron, the other flange 20 of which extends rearwardly from the upper part of said plunger 18 and at its rearward edge is bent upwardly slightly at 21. Suitably mounted on the frame of the receptacle 14 is a transverse shaft 22. Upon one end of the shaft 22 is a belt wheel 23. On the other end thereof is a pinion 24. Traveling on the pinion 24 is an oval internally toothed rack bar 25, which has a supporting back or plate 26 and a central guide plate 27 designed to bear against the hub of a pinion 24 for holding the teeth of the rack bar 25 in mesh with the teeth of the pinion 24.

Extending upwardly and forwardly from the upper and lower portions of the plunger 18 are arms 28. Two of the arms 28 are secured to the forward wall of the plunger 18 near the upper part thereof and two to the wall near the lower part thereof. Mounted on the upper arms 28 is a plate or board 29, designed to prevent the hay from dropping back of the plunger 18. The two members 28 which are pivoted to the plunger 18 near each end thereof are pivoted at their forward ends near the upper and lower ends respectively by vertical connecting bars 30. Extending downwardly and forwardly from the pivotal points just mentioned are parallel arms 31, which at their forward ends are pivoted to an upright frame member 32. The lower members 28 and 31, at each end of the plunger 18, are pivoted together and to the member 30, by means of a shaft 33, extending through them, as shown in Fig. 3. Extending rearwardly from the rack bar 25 is an arm 34, which divides into arms 35, pivoted to the shaft 33, near the end thereof, as clearly shown in Fig. 3. It will readily be seen that when the shaft 22 is rotated, the rack bar 25 will be operated, thereby imparting reciprocating horizontal motion to the plunger 18. In this connection it may be noted that the members 28 and 31 and 30 form a sort of lazy tongs lever. It should also be noted that the parts are so arranged and constructed that at the finish of the forward stroke of the plunger 18, the lower members 28 lie almost in the same plane with the arms 35 and 34 so that the arms 35 and 34 have almost a direct forward drive for forcing the plunger 18 against the bale.

The forward ends of the members 31 are pivoted to the frame member 32 by means of a shaft 36 which extends transversely across the machine. Fixed with relation to the forward lower ends of the arms 31 are sectors 37, at each end of the shaft 36, which mesh with and coact with sectors 38 mounted on another transverse shaft 39. Extending forwardly and downwardly from the shaft 39, preferably near the ends thereof, are short lever arms 40. Fixed to the forward ends of the lever arms 40 are upwardly and rearwardly extending bars or rods 41. In front of and above the shaft 39 are upright frame members 42, to which are centrally pivoted bell crank levers 43. Pivoted to the forwardly and upwardly extending arm of each bell crank lever 43, is a rod 44, which is secured to the adjacent rod 41 by means of a powerful coil spring 45. The rearward ends of the rearwardly and upwardly extending arms of the bell cranks 43 are provided with extensions 46 which incline inwardly to the center of the machine. At their inner adjacent ends the arms 46 are pivoted to the hay feeding device 47 near its middle. Pivoted to the upper end of the feeding device 47 is a forwardly extending link 48 which is pivoted at its forward end to an upwardly extending frame member 49.

The parts just described are so arranged that when the plunger is operated the hay feeding device 47 is operated through the parts described, so as to move downwardly for pushing the hay into the receptacle 14 when the plunger 18 is at the forward part of its stroke.

Mounted near the upper rearward part of the receptacle 14 is a tucker which will now be described. The transverse shaft 50 is mounted in vertical slots 51 in the frame members at the side of the machine. Mounted off center on the shaft 50 is a roller 52. Secured to the roller 52 are arms 53. Secured to the arms 53 are springs 54, which are in turn secured to the frame of the machine for holding the roller 52 down in such a position that the shaft 50 is in the upper part thereof, as shown in Fig. 2. The shaft 50 and the roller 52 are so located that when the plunger 18 makes its rearward stroke the upwardly curved portion 21 of the flange 20 engages said roller below the level of the shaft 50 and forces the roller rearwardly and upwardly, as shown in Fig. 4.

It will readily be seen that some of the hay will be drawn between the roller 52 and the portion 21. The plunger 18 passes beyond the roller, thereby leaving stringers of hay above the plunger and beneath the roller. The further operation of the tucker will be hereinafter more fully described.

Mounted above the frame members 12 to slide horizontally thereon, is a receiving frame 55, designed to receive the blocks which are placed between the successive bales of hay. Extending rearwardly from the frame 55 are horizontal arms 56. Extending downwardly from each of the horizontal arms 56 are two parallel arms 57. The arms 57 and the arms 56 are connected by transverse shafts 58 (Fig. 3.) Parallel transverse shafts 59 are mounted in the frame below the arm 56 and two of the shafts 59 are fixed to the lower ends of the arms 57. Fixed on one of the shafts 59 is a lever 60, for rotating said shaft and thereby sliding the receiving device 55 forwardly or rearwardly. The device 55 is designed to slide forwardly to a position just in front of and above the roller 52 to drop the block into the receptacle 14 in front of the plunger 18. The plunger on its rearward stroke receives the block and presses it against the hay. When the plunger makes its rearward stroke, some of the hay is drawn between the plunger and the tucker and thus forces the shaft 50 upwardly in the slots 51. The pawls 17 engage the hay or the block, as the case may be, and hold the hay or the block against the rebound. When the plunger moves forwardly the springs 54 draw the roller 52 downwardly, thereby tucking the hay down so that its free ends will be held in by the next bunch of hay pressed against the bale by the plunger.

It will be understood that numerous changes may be made in the details of the construction of my improved baler without departing from its essential features and it is my intention to cover by this application any such changes which may be included within the scope of the following claims.

I claim as my invention:

1. In a baler, a frame, a bale receiving means, a hay receptacle adjacent thereto and communicating therewith, a plunger adapted for reciprocation through said receptacle, a transverse shaft vertically slidable in said receptacle, adjacent to the upper part of the opening into said hay receiving means, a roller mounted off center on said shaft, said roller being adapted to be engaged by said plunger and to be rotated and raised from its lower to its upper position when the plunger moves rearwardly.

2. In a baler, a frame, a bale receiving means, a hay receptacle adjacent thereto and communicating therewith, a plunger adapted for reciprocation through said receptacle, a transverse shaft vertically slidable in said receptacle, adjacent to the upper part of the opening into said hay receiving means, a roller mounted off center on said shaft, said roller being adapted to be engaged by said plunger and rotated and raised from its lower to its upper position, and yielding means for holding the shaft at the lower position of its movement with the roller having its greatest radius from shaft center below the shaft.

Des Moines, Iowa, December 18, 1913.

MARY A. GIBBONS.

Witnesses:
L. ROBINSON,
M. WALLACE.